(12) United States Patent
Matsumoto et al.

(10) Patent No.: US 10,295,324 B2
(45) Date of Patent: May 21, 2019

(54) MEASURING INSTRUMENT

(71) Applicant: MITUTOYO CORPORATION, Kawasaki-shi, Kanagawa (JP)

(72) Inventors: Koji Matsumoto, Kure (JP); Yuji Fujikawa, Kure (JP); Shuji Hayashida, Kawasaki (JP); Nobuyuki Hayashi, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 100 days.

(21) Appl. No.: 15/611,087

(22) Filed: Jun. 1, 2017

(65) Prior Publication Data
US 2017/0356731 A1   Dec. 14, 2017

(30) Foreign Application Priority Data
Jun. 14, 2016  (JP) .................. 2016-118011

(51) Int. Cl.
*G01B 3/18*  (2006.01)
*G01B 3/00*  (2006.01)
*G01B 3/38*  (2006.01)

(52) U.S. Cl.
CPC .............. *G01B 3/002* (2013.01); *G01B 3/38* (2013.01)

(58) Field of Classification Search
CPC .......................................... G01B 3/18
USPC ......................... 33/504, 813, 819
See application file for complete search history.

(56) References Cited

U.S. PATENT DOCUMENTS

| | | | | |
|---|---|---|---|---|
| 5,102,471 A | * | 4/1992 | Sasaki .............. | G01B 3/18 136/244 |
| 5,551,162 A | * | 9/1996 | Struble ............ | G01B 5/14 33/544.4 |
| 5,657,550 A | * | 8/1997 | Struble ............ | G01B 5/14 33/544.4 |
| 6,502,057 B1 | | 12/2002 | Suzuki | |
| 7,100,298 B2 | * | 9/2006 | Kiwada ............ | G01B 3/22 33/613 |
| 2012/0066920 A1 | * | 3/2012 | Stangl ............. | G01C 9/06 33/366.11 |
| 2015/0276366 A1 | * | 10/2015 | Emtman ........... | G01B 3/205 33/701 |
| 2016/0123712 A1 | * | 5/2016 | Cook ............... | G01B 3/205 33/819 |
| 2018/0052017 A1 | * | 2/2018 | Niwano ........... | G01B 21/047 |

FOREIGN PATENT DOCUMENTS

JP  2007-305055 A  11/2007
JP     4456697 B2   4/2010

* cited by examiner

*Primary Examiner* — George B Bennett
(74) *Attorney, Agent, or Firm* — Oliff PLC (57) ABSTRACT

A measuring instrument includes a measuring unit, an electric component unit and a pin jack. The electric component unit includes a signal processing part. The signal processing part is configured to calculate a measurement data based on a detection signal obtained by the measuring unit. The pin jack is provided in the electric component unit.

14 Claims, 8 Drawing Sheets

MEASURING INSTRUMENT

CROSS-REFERENCE TO RELATED APPLICATION

This application claims the benefit of Japanese Patent Application No. 2016-118011, filed on Jun. 14, 2016, the entire contents of which are hereby incorporated by reference, the same as if set forth at length, the entire of which are incorporated herein by reference.

TECHNICAL FIELD

The present invention relates to a measuring instrument. In particular, the present invention relates to a measuring instrument capable of being connected to an external device.

BACKGROUND ART

As small measuring instruments which allow a measurer to carry out measurement by hand, for example, a vernier calipers or a micrometer are known. Such measuring instruments include a measuring instrument with output, which allows a measurement data to be outputted to the outside by wireless communication.

There are several types of measuring instruments with output.

A first type is a type in which a wireless communication function is incorporated into a small measuring instrument. Since the small measuring instrument is designed such that the wireless communication function is incorporated therein, completeness in product design is high and also operability is good. However, the wireless communication function is not always required for all users.

Therefore, a model, in which the wireless communication function is incorporated, and a model, in which the wireless communication function is not incorporated, are both manufactured and sold. However, this is not realistic to be developed in all types.

Therefore, types are also known, in which a connection port for a connector is provided in a small measuring instrument and an external wireless communication device is connected to the connection port via the connector (JP-A-2007-305055 and JP-B-4456697).

However, there are restrictions on position, size and shape, in which the connection port can be provided, depending on types or sizes of small measuring instruments. In addition, the connected external wireless communication device has not to become an obstacle in the way of measurement.

The small measuring instrument has the convenience of being capable of allowing measurement to be carried out while being grasped with one hand. However, a posture of grasping the measuring instrument is changed depending on an object to be measured or a site to be measured as well as a type of the measuring instrument.

Therefore, in JP-A-2007-305055, the external wireless communication device includes a connector, a wireless communication device and a flexible cable for connecting the connector to the wireless communication device.

In the case of this configuration, a degree of freedom of arrangement of the wireless communication device is increased regardless of a position of the connection port due to the flexible cable.

Also, in the external wireless communication device disclosed in JP-B-4456697, a connector and a wireless communication device are configured as an integral unit. When the connector is inserted into the connection port, the wireless communication device is simultaneously fixedly attached to the measuring instrument. Since the wireless communication function is fixedly attached to the measuring instrument, operability is good.

SUMMARY OF INVENTION

In the case of the configuration of JP-A-2007-305055, the degree of freedom of arrangement of the wireless communication device is increased regardless of a position of the connection port due to the flexible cable.

However, the cable is cumbersome and thus operability is also hindered.

Further, it is necessary to prepare a plurality of types of connectors depending on sizes or shapes of the connection ports. Although prices of the connectors may be relatively inexpensive, it is troublesome to manage the connectors if the number thereof is increased.

In the case of the configuration of JP-B-4456697, the wireless communication function is fixedly attached to the measuring instrument, thereby providing a good operability.

However, various types of external wireless communication devices have to be prepared for each of types or sizes of small measuring instruments, and thus burden on both manufacturers and users is increased.

Although in the foregoing, the problems to be solved are described with respect to the wireless communication function as an example, there are other functions, which are not always required for all users but are desired to be used in combination when necessary, such as a lighting, an auxiliary battery, an external memory, a printer or the like.

It is convenient that these can be detachably attached as external devices to the small measuring instrument, but there are problems as described above and thus commercialization thereof has not been successfully achieved so far.

An object of the present invention is to provide a measuring instrument, which allows an external device to be connected thereto without hindering operability, thereby allowing expansion in terms of functions.

According to one aspect of the disclosure, a measuring instrument includes a measuring unit, an electric component unit and a pin jack. The electric component unit includes a signal processing part for calculating a measurement data based on a detection signal obtained by the measuring unit. The pin jack is provided in the electric component unit.

According to one aspect of the disclosure, two or more pin jacks are provided.

According to one aspect of the disclosure, one of the pin jacks is provided on one side surface of the electric component unit and the other of the pin jacks is provided in another side surface of the electric component unit.

According to one aspect of the disclosure, a direction of an axis of the one pin jack and a direction of an axis of the other pin jack are different from each other by 90°.

According to one aspect of the disclosure, the measuring instrument includes a digital micrometer, a digital vernier calipers, or a digital indicator.

DESCRIPTION OF EMBODIMENTS

Exemplary Embodiments of the present invention will be illustrated and also described with reference to reference numerals attached to elements in the drawings.

First Embodiment

The first embodiment of the present invention will be described.

The present invention is configured such that when a connection port for connecting an external device is provided in a small measuring instrument, the connection port is unified into a multi-pole pin jack type.

Figure 1:
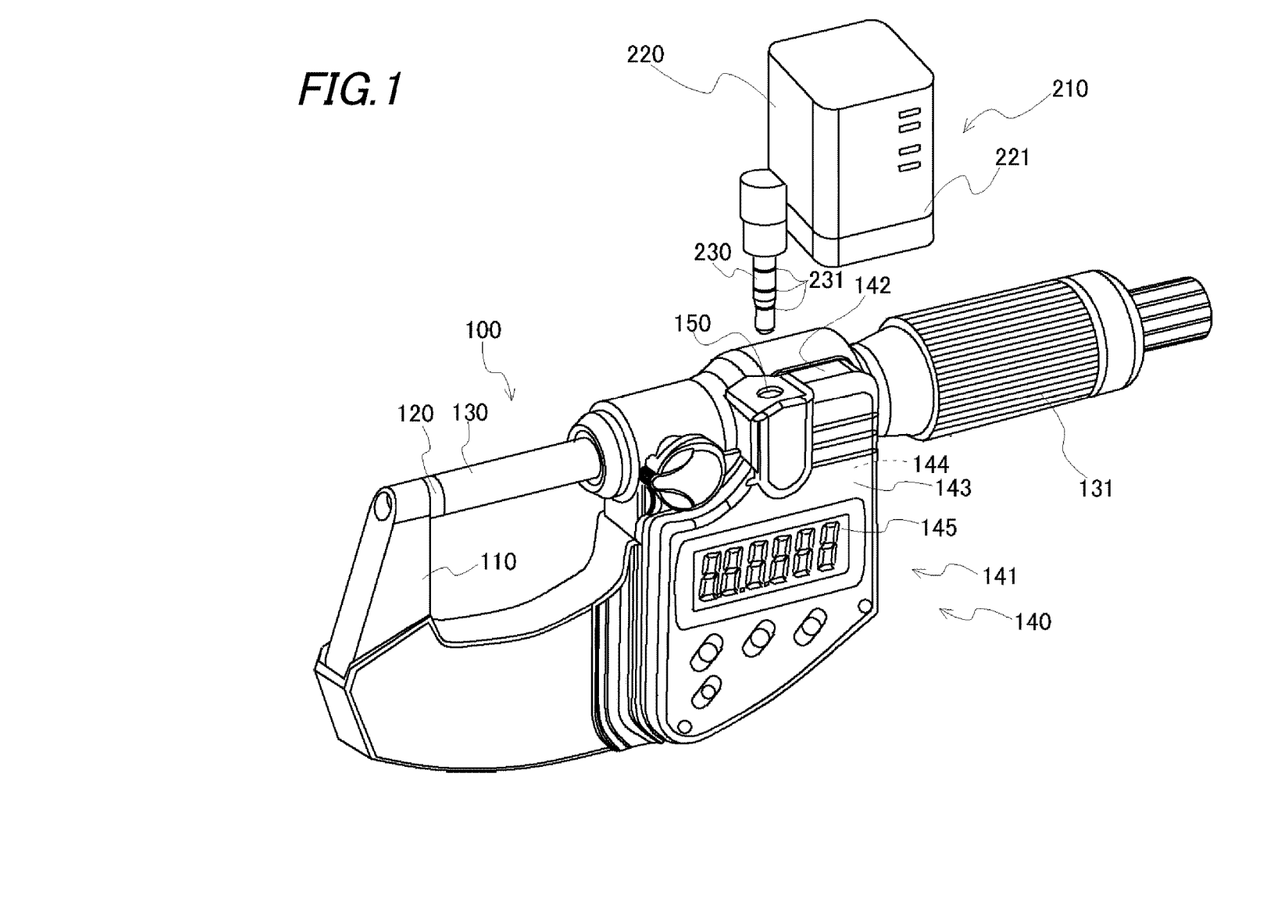
FIG. 1 is a view illustrating a micrometer.

FIG. 1 is a view illustrating a micrometer 100.

The micrometer 100 includes a U-shaped frame 110, an anvil 120, a spindle 130 and an electric component unit 140.

The anvil 120 is arranged in one end of the U-shaped frame 110, and the spindle 130 is arranged on the other end of the U-shaped frame 110 so that the spindle 130 can move back and forth against the anvil 120. When a thimble 131 is rotated with fingers, the spindle 130 is rotated together.

The spindle 130 is configured to be moved back and forth by a feed screw. Also, an encoder (rotary encoder) as a means for detecting an amount of rotation of the spindle 130 is provided on the other end of the U-shaped frame 110.

Herein, a measuring means for the micrometer is constituted of the U-shaped frame 110, the anvil 120, the spindle 130 and the encoder (detecting means).

The electric component unit 140 is provided on the other end of the U-shaped frame 110.

The electric component unit 140 has an electric component housing part 141, a signal processing part 144, a digital display part 145, and a pin jack 150 as a connector connection port.

The electric component housing part 141 is constituted of a receiving portion 142 formed by partially recessing the U-shaped frame 110 itself in the other end-side region of the U-shaped frame 110, and a lid portion 143 for closing an opening of the receiving portion 142.

Although in the figures, the opening is shown closed by the lid portion 143 and thus the recessed portion inside the receiving portion 142 is not shown, an outer surface of the receiving portion 142 is the same as an outer surface of the U-shaped frame 110. For example, it is shown in an upper surface portion of the micrometer in FIG. 1 or a side surface portion of the micrometer in FIG. 4.

Hereinafter, in FIG. 1, a side on which the lid portion 143 is attached will be referred to as a front side of the micrometer 100.

The signal processing part 144 is received in the receiving portion.

The signal processing part 144 has a variety of signal processing circuits, including, for example, a calculation portion for calculating a measurement data from a detection signal of the encoder (rotary encoder).

The digital display part 145 is configured to digitally display the measurement data. The digital display part 145 is provided on the lid portion 143.

The connector connection port is the pin jack 150.

As in FIG. 1, the pin jack 150 is provided on an upper side of the micrometer 100, in particular on a side end surface of an upper side of the lid portion 143.

Figure 2:
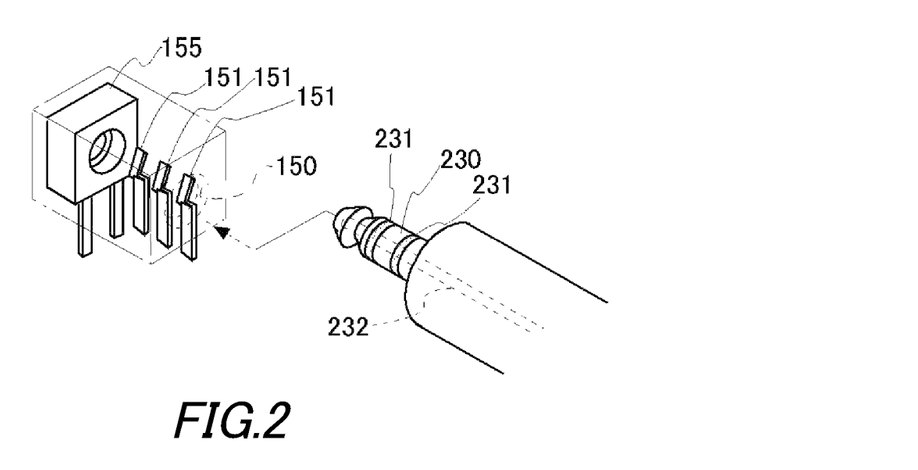
FIG. 2 is a view illustrating a pin jack and a pin plug.

The pin jack 150 is known per se, but is simply illustrated in FIG. 2.

The pin jack 150 is a circular hole in external appearance and has therein a plurality of electric contact portions 151 and an optical signal transmission/reception portion 155.

Herein, the pin jack 150 has three electric contact portions 151 and one optical signal transmission/reception portion 155 arranged on the innermost side thereof. However, the electric contact portions 151 and the optical signal transmission/reception portion 155 may be provided in larger numbers. The electric contact portions 151 and the optical signal transmission/reception portion 155 are connected to the signal processing part 144. An electric signal or optical signal can be communicated between the signal processing part 144 and the external device via the pin jack 150.

In FIG. 1, the external device is a wireless communication device 210.

The wireless communication device 210 has a communication module portion 220 and a pin plug 230 as a connector.

The communication module portion 220 has an antenna and a transmission/reception circuit and is received in a case body 221.

Herein, the case body 221 has a rectangular shape, but instead may have a cylindrical shape or the like.

The pin plug 230 is arranged to protrude from a side surface of the case body 221.

Herein, the pin plug 230 protrudes from one corner of the rectangular case body 221.

The pin plug 230 is a pin-shaped (cylindrical shape) electrode and is divided into multiple poles (three, four or more poles) by an insulating material 231.

The electrode of the pin plug 230, which is divided into multi poles, is constituted of a positive power source electrode, a GND electrode, a signal electrode and the like. Also, as illustrated in FIG. 2, an optical fiber 232 for transmitting an optical signal therethrough is provided at the center of the pin plug 230.

Meanwhile, although the pin plug 230 configured to transmit both of an electrical signal and an optical signal is illustrated herein, the optical fiber 232 is unnecessary if it is desired to transmit only the electric signal. Also, if it is desired to transmit only an electric power, only two poles for the positive power source electrode and the GND electrode may be provided. The number of poles of the pin plug 230 may be appropriately designed depending on the type of the external device.

As shown in FIG. 1, the pin plug 230 is inserted into the pin jack 150 so that the wireless communication device 210 is attached to the micrometer 100. As a result, the micrometer 100 having a wireless communication function is obtained.

Benefits of unifying the connector into a multi-pole pin jack type will be described.

If the connection port is configured as the pin jack 150, a size of the hole of the pin jack 150 itself can be set to be small, although a depth thereof is required to some extent. Therefore, the pin jack 150 can be provided in all types of small measuring instruments. As a result, it is also possible to unify connectors of all small measuring instruments into the pin jack 150. Then, a user is unnecessary to prepare a plurality of connectors or cables for each of types of small measuring instruments and can commonly use the same external device for a plurality of types.

Since the pin jack 150 and the pin plug 230 have a circular shape, the pin plug 230 may be rotated while being inserted in the pin jack 150.

For example, if the wireless communication device 210 is inserted into the micrometer 100 as in FIG. 1, the communication module portion 220 protrudes from the surface of the micrometer 100.

Figure 3:
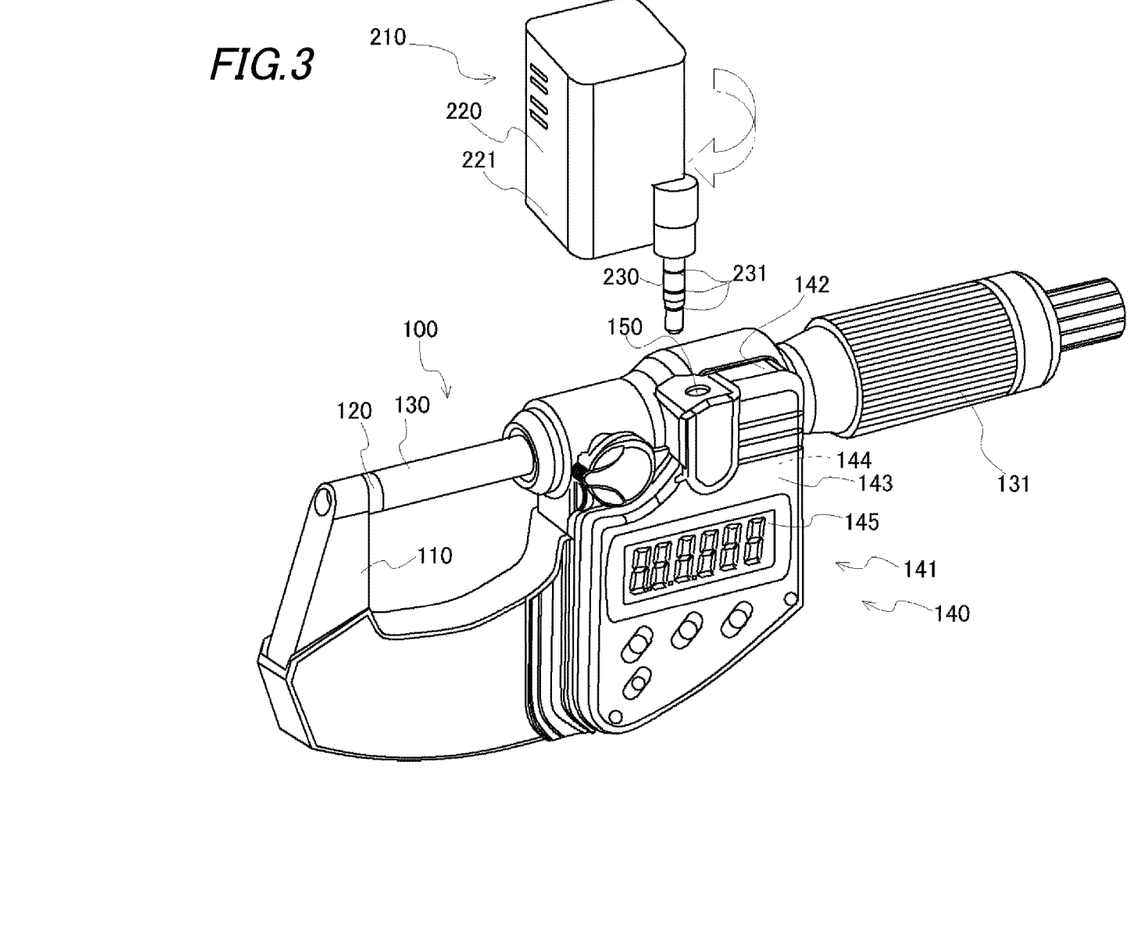
FIG. 3 is a view illustrating a micrometer.

When the wireless communication device 210 is rotated about an axis of the pin plug 230 as a rotation center by 180°, as illustrated in FIG. 3, the communication module portion 220 protrudes on the rear side of the micrometer 100, but does not protrude on the front side of the micrometer 100.

A posture of grasping the micrometer 100 is changed depending on an object to be measured or a site to be measured, but it is convenient that the wireless communication device 210 can be rotated not to become an obstacle depending on a posture of the micrometer 100.

Figure 4:
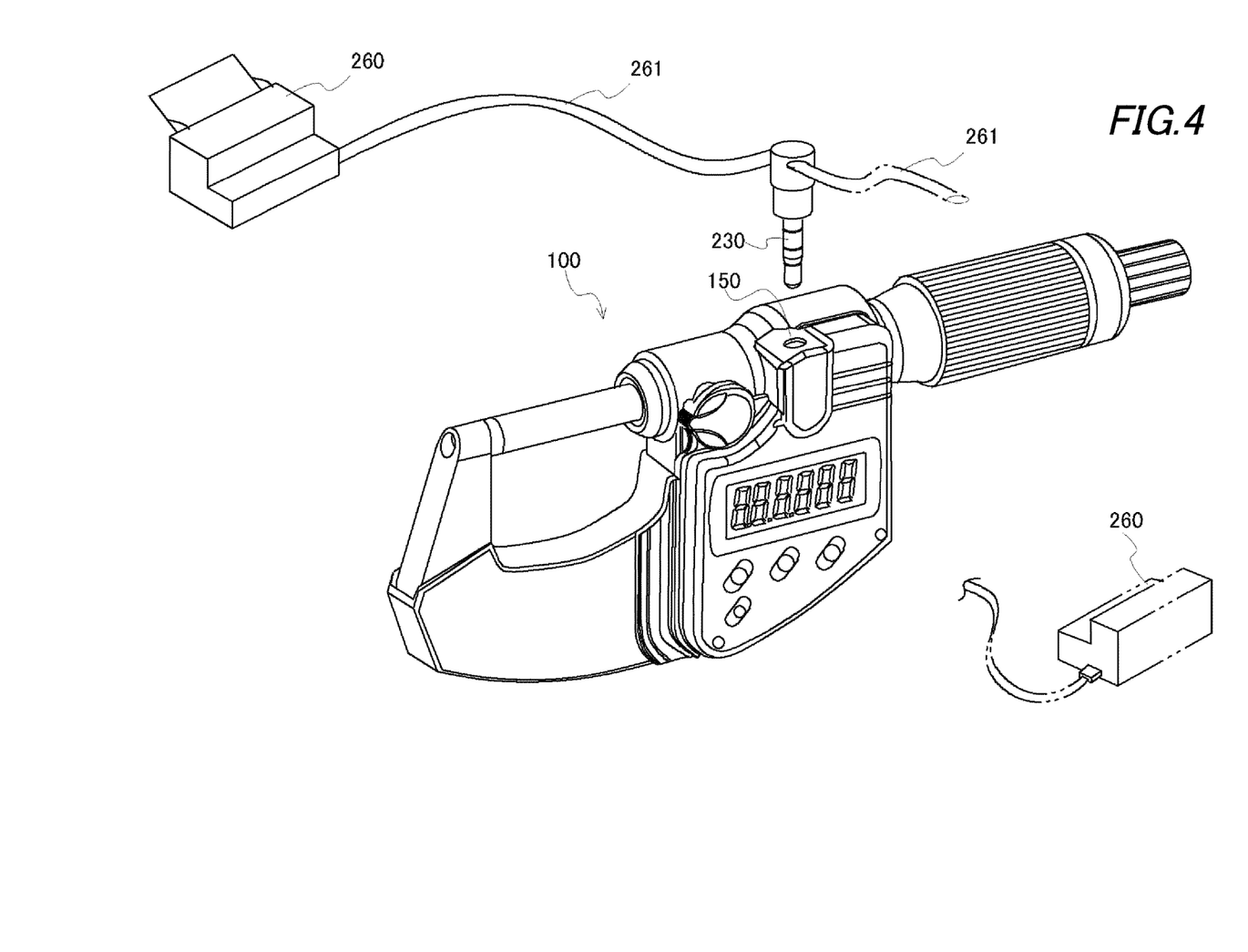
FIG. 4 is a view illustrating an aspect in which a micrometer and an external device are connected with each other via a pin plug and a cable.

Although the case where the pin plug 230 is integrated with the wireless communication device 210 is illustrated in FIG. 1 or 3, the micrometer 100 may be connected to the external device via a cable 261 extending from the pin plug 230 as illustrated in FIG. 4.

For example, in FIG. 4, the micrometer 100 is connected to a printer 260 via the cable 261.

By skillfully rotating the pin plug 230, the cable 261 can be arranged to protrude on the rear side of the micrometer 100 (see a solid line in FIG. 4), and the cable 261 can be also arranged to protrude on the front side of the micrometer 100 (see a two-dot chain line in FIG. 4).

By the way, if instead of the pin jack type, for example, a USB connector is employed, it is impossible to freely rotate the connector itself.

In this case, a movable part, such as a hinge or a coupler, has to be incorporated between the connector and the module portion, but it is troublesome to provide such a movable part while maintaining a signal transmission function.

On the other hand, if a relatively soft cable 261 is employed, the cable might hardly become an obstacle, but a possibility that the cable is easily broken is correspondingly increased.

Figure 5:
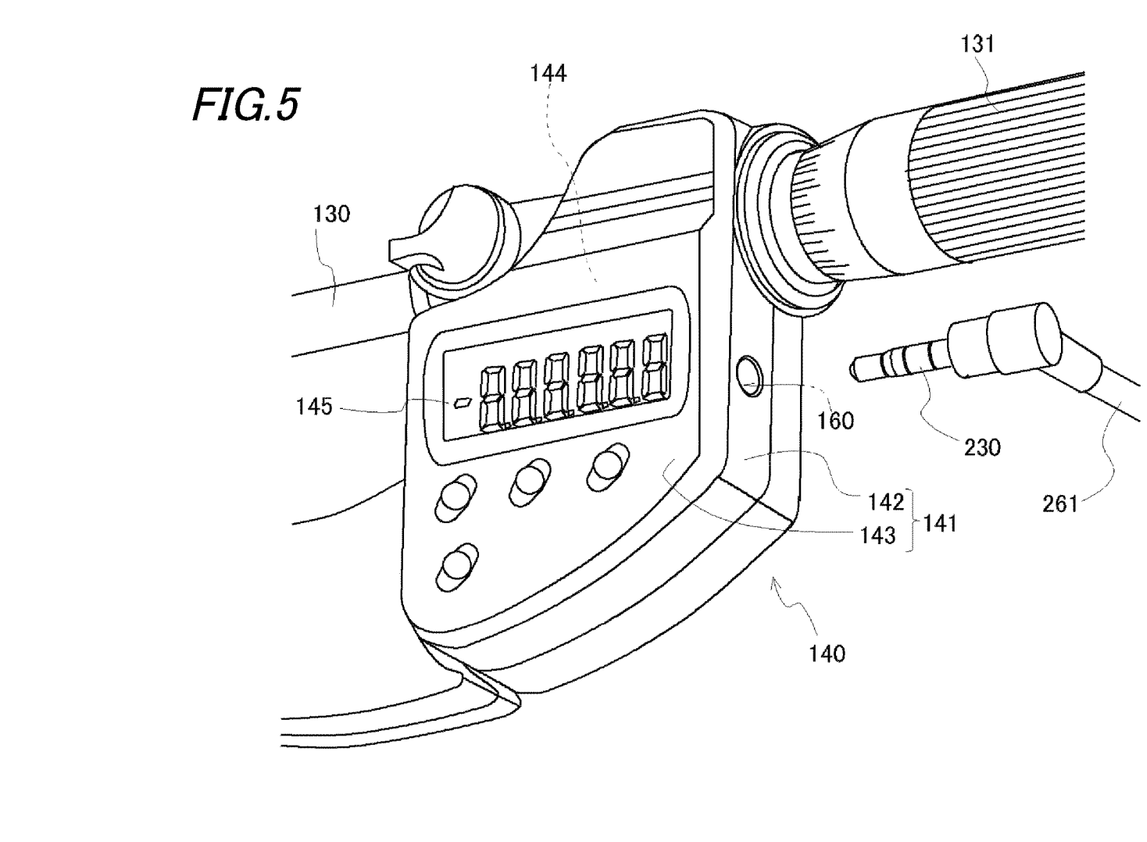
FIG. 5 is a view illustrating a second pin jack.

Since an installation space for the pin jack 150 is small, a degree of freedom of a position at which the pin jack 150 is provided is high, for example, as illustrated in FIG. 5.

In FIG. 5, the pin jack is provided in a side surface of the other end of the receiving portion 142. The pin jack is referred to as a second pin jack 160.

Figure 6:
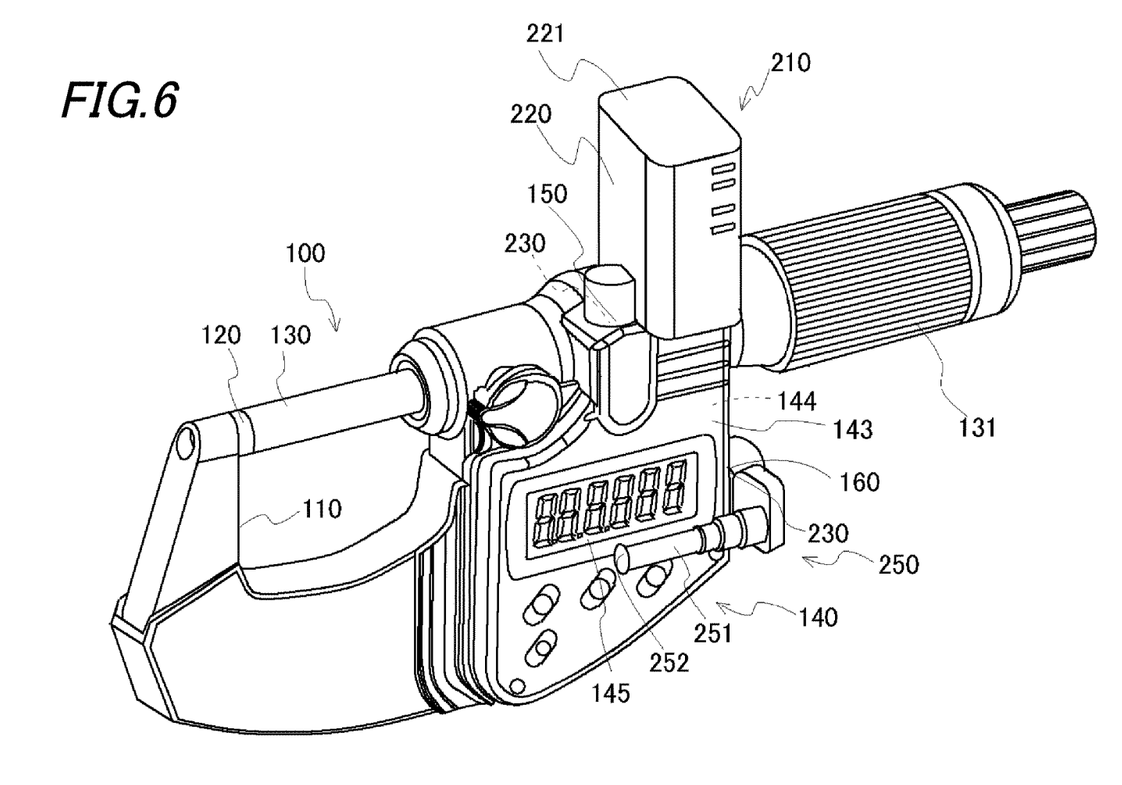
FIG. 6 is a view illustrating a micrometer having two pin jacks.

Further, as illustrated in FIG. 6, a plurality of pin jacks 150, 160 may be provided in the micrometer 100. Then, a plurality of external devices can be connected to the micrometer 100.

For example, FIG. 6 is a view illustrating a state where a wireless communication device 210 and a lighting device 250 are attached to the micrometer 100. Namely, the wireless communication device 210 is attached to the first pin jack 150 and the lighting device 250 is attached to the second pin jack 160.

The lighting device 250 has a pin plug 230, a rod 251 and a light emitting diode 252.

A base end of the rod 251 is connected to the pin plug 230 and the light emitting diode 252 is arranged on a distal end of the rod 251.

Herein, the rod 251 and the pin plug 230 are provided to be parallel to each other, so that when the pin plug 230 is inserted into the second pin jack 160, the distal end of the rod 251 is positioned in the vicinity of the digital display part 145.

By the way, even if the lighting device 250 is inserted into the first pin jack 150, the distal end of the rod 251 is positioned in the vicinity of the digital display part 145. Therefore, the lighting device 250 may be inserted into either pin jack 150, 160.

In this way, by providing a plurality of pin jacks, 150, 160 in the micrometer 100, it possible to retrofit a plurality of functions to the micrometer 100.

When two pin jacks 150, 160 are provided, the two pin jacks may be provided side-by-side. It goes without saying that as the number of pin jacks is increased, the number of external devices to be attached thereto is increased.

Alternatively, when two pin jacks 150, 160 are provided, it can be said that it is preferable to separate the two pin jacks from each other, rather than side-by-side.

For example, if the first pin jack 150 is provided in the upper surface of the electric component housing part 141, it is preferable that the second pin jack 160 is provided, for example, in a right or left side surface or a lower surface of the electric component housing part 141, other than the upper surface of the electric component housing part 141.

Further, it is preferable that holes of the pin jacks are oriented in different directions.

In FIG. 6, a direction of an axis of the first pin jack 150 and a direction of an axis of the second pin jack 160 are different from each other by 90°. In other words, the direction of the axis of the first pin jack 150 may intersect with the direction of the axis of the second pin jack 160 by 90°.

Meanwhile, the present invention is not limited to the foregoing embodiments, but can be appropriately modified within the scope without departing from the spirit of the invention.

Although in the foregoing description, the pin jacks 150, 160 are provided in the micrometer 100, the small measuring instrument may be a digital vernier calipers, a digital indicator (dial gauge) or the like.

Figure 7:
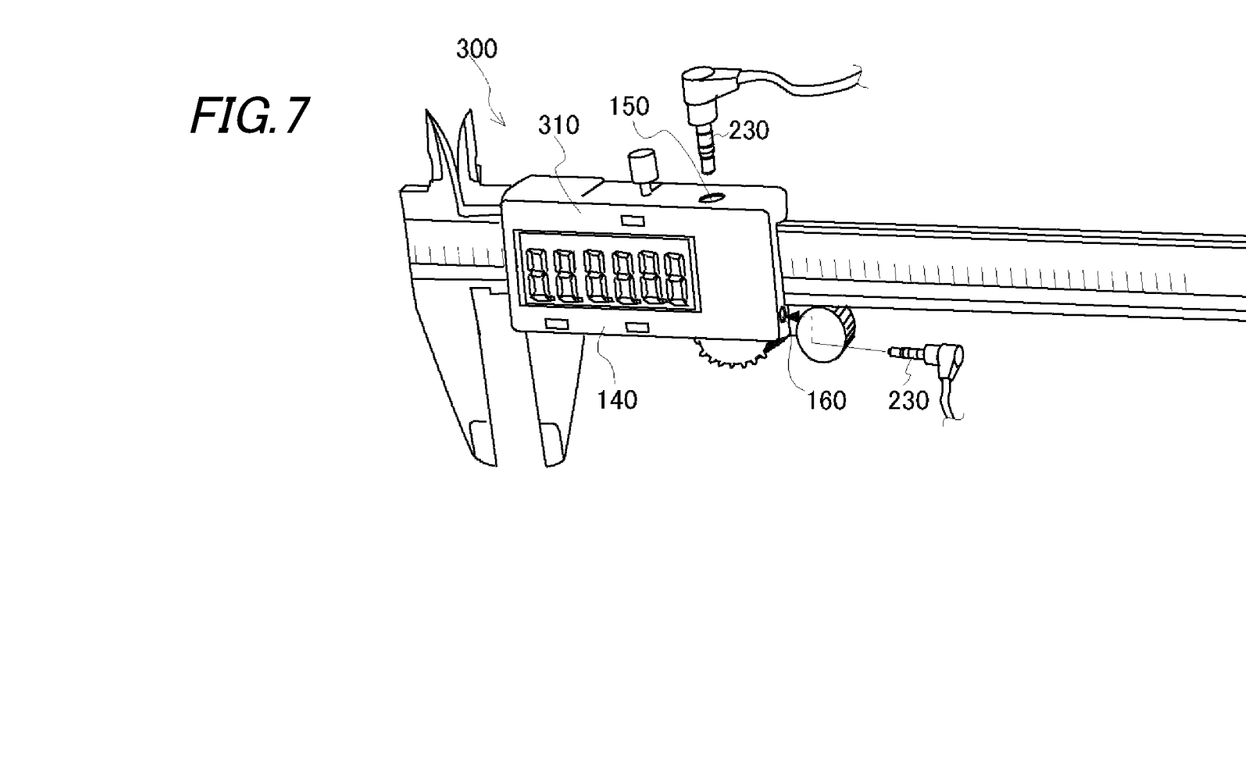
FIG. 7 is a view illustrating a vernier calipers.

In FIG. 7, an example in which pin jacks 150, 160 are provide in a vernier calipers 300 is shown. A slider 310 of the vernier calipers 300 serves as an electric component unit 140 and the pin jacks 150, 160 are respectively provided in an upper surface portion and a side surface portion of the slider 310. Meanwhile, a measuring means for the vernier calipers is constituted of a jaw of a main scale, a jaw of the slider, and an encoder (linear encoder) for detecting a relative displacement between the main scale and the slider.

Figure 8:
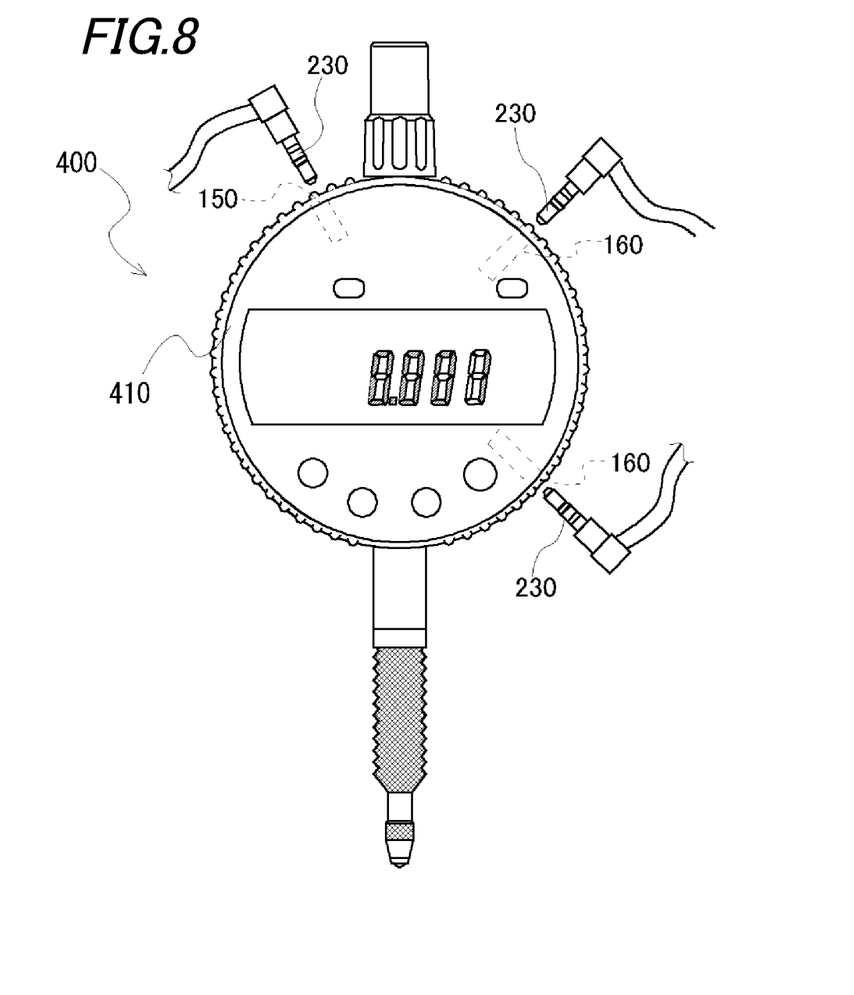
FIG. 8 is a view illustrating an indicator.

In FIG. 8, an example in which pin jacks 150, 160 are provide in an indicator (dial gauge) 400 is shown. A body portion 410 of the indicator 400 serves as an electric component unit 140, and a plurality of pin jacks 150, 160 are provided in a side surface of the body portion 410. Meanwhile, a measuring means for the indicator (dial gauge) is constituted of the body portion, a spindle provided in the body portion to axially move back and forth, and an encoder (linear encoder) for detecting a displacement of the spindle.

What is claimed is:
1. A measuring instrument, comprising:
a measuring unit;
an electric component unit that includes:
  a signal processing part to calculate a measurement data based on a detection signal obtained by the measuring unit, and
  a digital display part provided on one face of the electric component unit to digitally display a measurement data; and
a pin jack that is provided in the electric component unit, wherein the pin jack is provided on one side surface of the electric component unit, the one side surface being perpendicular to the one face of the electric component unit, and wherein the pin jack is a multi-pole pin jack and has a substantially circular hole shape.

2. The measuring instrument according to claim 1, wherein two or more pin jacks are provided.

3. The measuring instrument according to claim 2, wherein one of the pin jacks is provided on one side surface of the electric component unit and the other of the pin jacks is provided in another side surface of the electric component unit.

4. The measuring instrument according to claim 2, wherein a direction of an axis of the one pin jack and a direction of an axis of the other pin jack are different from each other by 90°.

5. The measuring instrument according to claim 1, wherein the measuring instrument includes a digital micrometer, a digital vernier calipers, or a digital indicator.

6. The measuring instrument according to claim 1, further comprising a spindle,
wherein a moving direction of the spindle is perpendicular to a direction of an axis of the pin jack.

7. The measuring instrument according to claim 1, further comprisinga spindle,
wherein a moving direction of the spindle is parallel to a direction of an axis of the pin jack.

8. The measuring instrument according to claim 1, further comprising a slider,
wherein a moving direction of the slider is perpendicular to a direction of an axis of the pin jack.

9. The measuring instrument according to claim 1, further comprising a slider,
wherein a moving direction of the slider is parallel to a direction of an axis of the pin jack.

10. A measuring instrument, comprising:
a measuring unit;
an electric component unit that includes:
   a signal processing part to calculate a measurement data based on a detection signal obtained by the measuring unit, and
   a digital display part provided on one face of the electric component unit to digitally display an measurement data; and
two or more pin jacks that are provided in the electric component unit,
wherein one of the two or more pin jacks is provided on one side surface of the electric component unit, the one side surface being perpendicular to the one face of the electric component unit, and the other of the pin jacks is provided in another side surface of the electric component unit, the another side surface being perpendicular to the one face of the electric component unit.

11. The measuring instrument according to claim 10, further comprising a spindle,
wherein a moving direction of the spindle is perpendicular to a direction of an axis of the one of the two or more pin jacks, and
wherein the two or more pin jacks are multi-pole pin jacks and have a substantially circular hole shape.

12. The measuring instrument according to claim 10, further comprising a slider,
wherein a moving direction of the slider is perpendicular to a direction of an axis of the one of the two or more pin jacks, and
wherein the two or more pin jacks are multi-pole pin jacks and have a substantially circular hole shape.

13. The measuring instrument according to claim 10,
wherein a direction of an axis of the one of the two or more pin jacks and a direction of an axis of the other of the two or more pin jacks are different from each other by 90 degrees.

14. A measuring instrument, comprising:
a measuring unit;
an electric component unit that includes:
   a signal processing part to calculate a measurement data based on a detection signal obtained by the measuring unit, and
   a digital display part provided on one face of the electric component unit to digitally display an measurement data; and
two or more pin jacks that are provided in the electric component unit,
wherein the two or more pin jacks are provided on a peripheral surface of the electric component unit, the peripheral surface being perpendicular to the one face.

* * * * *